(12) United States Patent
Cho

(10) Patent No.: US 12,163,893 B2
(45) Date of Patent: Dec. 10, 2024

(54) SAMPLE INGREDIENT ANALYSIS APPARATUS AND SAMPLE INGREDIENT ANALYSIS METHOD USING THE SAME

(71) Applicant: ANSWERAY INC., Gwacheon-si (KR)

(72) Inventor: Seong Ho Cho, Gwacheon-si (KR)

(73) Assignee: ANSWERAY INC., Gwacheon-si (KR)

( * ) Notice: Subject to any disclaimer, the term of this patent is extended or adjusted under 35 U.S.C. 154(b) by 0 days.

(21) Appl. No.: 18/521,255

(22) Filed: Nov. 28, 2023

(65) Prior Publication Data

US 2024/0219306 A1 Jul. 4, 2024

(30) Foreign Application Priority Data

Dec. 29, 2022 (KR) .................. 10-2022-0189109
Apr. 19, 2023 (KR) .................. 10-2023-0051285

(51) Int. Cl.
*G01N 21/65* (2006.01)

(52) U.S. Cl.
CPC ... *G01N 21/65* (2013.01); *G01N 2201/06113* (2013.01)

(58) Field of Classification Search
CPC .................. G01N 21/65; G01N 2201/06113
See application file for complete search history.

(56) References Cited

U.S. PATENT DOCUMENTS 7,233,870 B1 * 6/2007 Dalrymple ............ G06F 18/00
  702/76
7,688,454 B1 * 3/2010 Janik .................. G01B 11/0616
  356/601
2003/0133292 A1 * 7/2003 Mueller ................. H05B 45/22
  362/231

(Continued)

FOREIGN PATENT DOCUMENTS

JP      2022-541519 A    9/2022
KR  10-2015-0116999 A   10/2015

(Continued)

OTHER PUBLICATIONS

Korean Office Action for related KR Application No. 10-2023-0051285 mailed Jun. 12, 2023 from Korean Intellectual Property Office.

(Continued)

*Primary Examiner* — Tung S Lau
(74) *Attorney, Agent, or Firm* — Paratus Law Group, PLLC

(57) ABSTRACT

Disclosed is a sample ingredient analysis apparatus including a first spectrum collection unit configured to radiate first light to a sample in order to generate a first spectrum and to concentrate the first spectrum, a second spectrum collection unit configured to radiate second light to the sample in order to generate a second spectrum and to concentrate the second spectrum, a data analyzer configured to receive the first and second spectra from the first and second spectrum collection units, to generate first and second spectral data based on the first and second spectra, and to calculate the first and second spectral data in order to obtain spectral data, and a data terminal configured to receive the first and second spectra data and the spectral data from the data analyzer and to display the first and second spectra and the spectral data to the outside.

17 Claims, 9 Drawing Sheets

(56) References Cited

U.S. PATENT DOCUMENTS

| | | | | |
|---|---|---|---|---|
| 2004/0125371 A1* | 7/2004 | Chang | ................. | G01J 3/4406 |
| | | | | 250/461.1 |
| 2007/0222981 A1* | 9/2007 | Ponsardin | ................. | G01J 3/44 |
| | | | | 356/301 |
| 2011/0241549 A1* | 10/2011 | Wootton | ................. | F21V 29/60 |
| | | | | 257/E33.012 |
| 2012/0262711 A1* | 10/2012 | Oda | ................. | G01J 3/4406 |
| | | | | 250/226 |
| 2014/0016300 A1* | 1/2014 | Sato | ................. | F21S 41/16 |
| | | | | 362/84 |

FOREIGN PATENT DOCUMENTS

| | | |
|---|---|---|
| KR | 10-2021-0040572 A | 4/2021 |
| KR | 10-2021-0077170 A | 6/2021 |

OTHER PUBLICATIONS

Korean Notice of Allowance for related KR Application No. 10-2023-0051285 mailed Oct. 23, 2023 from Korean Intellectual Property Office.

* cited by examiner

SAMPLE INGREDIENT ANALYSIS APPARATUS AND SAMPLE INGREDIENT ANALYSIS METHOD USING THE SAME

CROSS-REFERENCE TO RELATED APPLICATION

This application claims the benefit of priority to Korean Patent Application No. 10-2022-0189109 filed on Dec. 29, 2022 and Korean Patent Application No. 10-2023-0051285 filed on Apr. 19, 2023, the disclosure of which is incorporated herein by reference in its entirety.

BACKGROUND OF THE INVENTION

1. Field of the Invention

The present invention relates to a sample ingredient analysis apparatus capable of, upon measuring optical properties a sample including at least one measurement target material and a medium that encloses the measurement target material, generating spectral data of the measurement target material and the medium in consideration of elastic scattering properties and inelastic scattering properties of the measurement target material and the medium with respect to incident light and analyzing the sample based on the spectral data and a sample ingredient analysis method using the same.

2. Description of the Related Art

In general, a Raman spectrometer uses Raman spectroscopy capable of performing non-destructive analysis since Raman spectroscopy does not particularly require a process of pre-treating a sample to be analyzed. Basically, Raman spectroscopy is based on the principle of radiating excitation light (e.g. a laser) to a material to be analyzed and generating scattered light from the material to be analyzed to measure the relative energy (or wavelength or frequency) change of inelastically scattered light relative to the excitation light, whereby analysis results of the material to be analyzed are not affected by the wavelength of the excitation light.

In addition, Raman spectroscopy has numerous advantages in that analysis time for the material to be analyzed is short when the material to be analyzed has a large Raman scattering response, analysis of the material to be analyzed is possible in a liquid state, a solid state, or a gaseous state, and there is no risk of damaging the material to be analyzed (hereinafter referred to as a target material) since Raman spectroscopy is a non-destructive method. In order to implement Raman spectroscopy, a conventional Raman spectrometer 50 includes an optical detection unit 10, an optical calculation unit 20, and a controller 40.

The controller 40 controls the optical detection unit 10 and the optical calculation unit 20. The optical detection unit 10 radiates light L1 to a measurement sample 8 through a laser light source 2 and collects first Raman scattered light L2 (FIG. 2) from the measurement sample 8. In FIG. 2, the measurement sample 8 is collected outdoors or indoors, and includes a target material 4 and a medium 6 that encloses the target material 4. The target material 4 is made of at least one material. The first Raman scattered light L2 is converted into first spectral data in the optical detection unit 10. The first spectral data is represented as light intensity $A(\lambda)$ of a wavelength function in the optical detection unit 10.

The optical calculation unit 20 receives the first spectral data from the optical detection unit 10. The optical calculation unit 20 has in advance second spectral data corresponding to second Raman scattered light associated with the at least one target material 4 without a medium. The second spectral data is represented as light intensity $B(\lambda)$ of a wavelength function in the optical calculation unit 20. The optical calculation unit 20 calculates spectral data 35 (FIG. 3) using the first and second spectral data $A(\lambda)$ and $B(\lambda)$.

That is, the spectral data 35 is obtained from $A=B*C+R$ (where A is an $n*1$-dimensional matrix associated with $A(\lambda)$, B is an $n*m$-dimensional matrix associated with $B(\lambda)$, C is an $m*1$-dimensional matrix, and R is an $n*1$-dimensional matrix), which is a matrix equation, in the optical calculation unit 20, and is realized as a value that has the same dimension as the matrix A and is close to the matrix A through the matrix $B*C$. C is concentration data of the target material 4. The spectral data 35 is externally represented as light intensity of a wavelength function in the controller 40, as shown in FIG. 3.

While being radiated to the measurement sample 8, however, the light L1 is partially absorbed (see L3 in FIG. 2) and reflected (not shown) before reaching the target material 4 via the medium 6, and elastically and inelastically scattered (L4 in FIG. 2) between the medium 6 and the target material 4. As a result, the light L1 reaches the target material 4 in the state in which some energy of the light L1 is consumed in the medium 6. That is, the spectral data 35 cannot be realized as a value that has the same dimension as the matrix A and is close to the matrix A through the matrix $B*C$ even though the matrix R is minimized to a zero matrix since the matrix equation does not take the properties of the medium 6 into account.

SUMMARY OF THE INVENTION

The present invention has been made in view of the above problems, and it is an object of the present invention to provide a sample ingredient analysis apparatus configured such that, when a sample collected outdoors or indoors and including a medium that encloses at least one target material is placed in the sample ingredient analysis apparatus, spectral data of the sample is generated in consideration of the properties of the medium and the properties of the target material, and the sample is analyzed based on the spectral data, and a sample ingredient analysis method using the same.

In accordance with aspect of the present invention, the above and other objects can be accomplished by the provision of a sample ingredient analysis apparatus including a first spectrum collection unit configured to radiate first light to a sample in order to generate a first spectrum and to concentrate the first spectrum, a second spectrum collection unit configured to radiate second light to the sample in order to generate a second spectrum and to concentrate the second spectrum, a data analyzer configured to receive the first second spectra from the first and second spectrum collection units, to generate first and second spectral data based on the first and second spectra, and to calculate the first and second spectral data in order to obtain spectral data, and a data terminal configured to receive the first and second spectra data and the spectral data from the data analyzer and to display the first and second spectra and the spectral data to the outside, wherein the sample is collected outdoors or indoors and includes at least one measurement target material and a medium configured to enclose the measurement target material.

The first spectrum may be generated as the result of the first light of a broadband wavelength emitted from a lamp being transmitted through or reflected from the sample when the first light is incident on the sample in the first spectrum collection unit, and may have lower intensity than the first light.

The second spectrum may be generated as the result of the second light of a narrowband wavelength emitted from a laser light source being Raman scattered from the sample when the second light is incident on the sample in the second spectrum collection unit, and may have a longer wavelength than the second light.

When the first light is represented as incident light intensity ($I_{in}(\lambda)$) of a wavelength function and the first spectrum is represented as transmitted light intensity ($I_{out}(\lambda)$) of the wavelength function, the first spectral data may be represented as $I_{out}(\lambda)/I_{in}(\lambda)=F(\lambda)$.

When the measurement target material generates the second spectrum through Raman scattering after contact between the second light and the sample, the second spectral data may represent the second spectrum as light intensity ($S(\lambda)$) of a wavelength function.

When the first spectral data ($F(\lambda)$) is represented as $I_{out}(\lambda)/I_{in}(\lambda)$, the second spectral data ($S(\lambda)$) is represented as light intensity of a wavelength function, and the data analyzer has in advance third spectral data ($K(\lambda)$) corresponding to the measurement target material without a medium as light intensity of the wavelength function, the spectral data may be obtained from $S=F*K*C+R$ (where S is an n*1-dimensional matrix associated with $S(\lambda)$, F is an n*n-dimensional matrix associated with $F(\lambda)$ as a calibration factor, K is an n*m-dimensional matrix associated with $K(\lambda)$, C is an m*1-dimensional matrix, and R is an n*1-dimensional matrix), which is a matrix equation, in the data analyzer, and may be realized as a value that has the same dimension as the matrix S and is close to the matrix S through the matrix F*K*C.

The matrix R may be the difference between the matrix S and the matrix F*K*C, and the matrix C may be concentration data of the measurement target material and may be represented as a matrix $((F*K)^T*(F*K))^{-1}*(F*K)^T w*S$ as the result of the matrix R being minimized to a zero matrix through calculation of the matrix equation.

When the data analyzer shares third spectral data of the data terminal, the data terminal may be a computer or a smartphone and may be configured to automatically perform control such that operations of the first and second spectrum collection units and the data analyzer can be collectively performed through operation-related firmware or individually performed through operation-related programs or to manually control the first and second spectrum collection units and the data analyzer through manipulation at the outside in a wired or wireless manner, to store the first to third spectral data and the spectral data in the data analyzer or to store the first to third spectral data and the spectral data in an Internet server over wired or wireless Internet, to receive the first to third spectral data and the spectral data from the data analyzer or the Internet server and to internally analyze the first to third spectral data and the spectral data through an analysis-related program, when the operation-related firmware or the operation-related program is operated internally or when a menu on an analysis platform including software, an application program, a web page, or a website is clicked externally, to retrieve the first to third spectral data and the spectral data from the data analyzer or the Internet server and to display the first to third spectral data and the spectral data on a screen so as to be visible from the outside, and when the operation-related firmware or the operation-related program is operated internally or when the menu on the analysis platform including the software, the application program, the web page, or the website is clicked externally, to display material analysis results including the type and material concentration of the measurement target material obtained through the spectral data and materials detected as being abnormal on an analysis summary screen.

In accordance with another aspect of the present invention, there is provided a sample ingredient analysis method using a sample ingredient analysis apparatus, the sample ingredient analysis method including preparing a sample in first and second spectrum collection units, concentrating, by the first and second spectrum collection units, first and second spectra from the sample, calculating, by a data analyzer, spectral data based on the first and second spectra, and displaying, by a data terminal, the spectral data to the outside, wherein the sample is collected outdoors or indoors and includes at least one measurement target material and a medium configured to enclose the measurement target material.

The preparing a sample may include locating the sample in the first and second spectrum collection units by moving the sample or dividing the sample and simultaneously locating the divided samples in the first and second spectrum collection units.

The concentrating first and second spectra may include radiating, by a first optical instrument of the first spectrum collection unit, first light to the sample to collect a first spectrum while generating the first spectrum from the sample and radiating, by a second optical instrument of the second spectrum collection unit, second light to the sample to collect a second spectrum while generating the second spectrum from the sample, and the first or second optical instrument may include at least one of a lamp, a laser light source, a lens, a mirror, an optical fiber, a dichroic mirror, a band pass filter, a long pass filter, a diffraction grating, and a prism.

The first spectrum may be generated as the result of the first light of a broadband wavelength emitted from the lamp being transmitted through or reflected from the sample when the first light is incident on the sample in the first spectrum collection unit, and may have lower intensity than the first light.

The second spectrum may be generated as the result of the second light of a narrowband wavelength emitted from the laser light source being Raman scattered from the sample when the second light is incident on the sample in the second spectrum collection unit, and may have a longer wavelength than the second light.

The calculating spectral data may include generating, by an optical detection unit of the data analyzer, first and second spectral data based on the first and second spectra received from the first and second spectrum collection units and calculating, by a calculation unit of the data analyzer 110, the first and second spectral data to obtain the spectral data.

When the first spectrum collection unit collects the first spectrum from the sample as the result of first light of a broadband wavelength from the lamp being incident on the sample and the data analyzer represents the first light as incident light intensity ($I_{in}(\lambda)$) of a wavelength function and the first spectrum as transmitted light intensity ($I_{out}(\lambda)$) of the wavelength function, the first spectral data may be represented as $I_{out}(\lambda)/I_{in}(\lambda)=F(\lambda)$ in the detection unit of the data analyzer.

When the second spectrum collection unit collects the second spectrum from the sample as the result of second light of a narrowband wavelength from the laser light source being incident on the sample, the second spectral data may represent the second spectrum as light intensity (S(λ)) of a wavelength function in the detection unit of the data analyzer.

When the first spectral data (F(λ)) is represented as $I_{out}(λ)/I_{in}(λ)$, the second spectral data (S(λ)) is represented as light intensity of a wavelength function, and the data analyzer has in advance third spectral data (K(λ)) corresponding to the measurement target material without a medium as light intensity of the wavelength function, the spectral data may be obtained from S=F*K*C+R (where S is an n*1-dimensional matrix associated with S(λ), F is an n*n-dimensional matrix associated with F(λ) as a calibration factor, K is an n*m-dimensional matrix associated with K(λ), C is an m*1-dimensional matrix, and R is an n*1-dimensional matrix), which is a matrix equation, in a calculator of the data analyzer, and may be realized as a value that has the same dimension as the matrix S and is close to the matrix S through the matrix F*K*C.

The matrix R is the difference between the matrix S and the matrix F*K*C, and the matrix C may be concentration data of the measurement target material and may be represented as a matrix $((F*K)^T*(F*K))^{-1}*(F*K)^T*S$ as the result of the matrix R being minimized to a zero matrix through calculation of the matrix equation.

When the data analyzer has the spectral data and first and second spectral data and the data terminal shares third spectral data of the data analyzer, the displaying the spectral data to the outside may include receiving, by the data terminal, the spectral data and the first to third spectral data from the data analyzer and displaying, by the data terminal, the spectral data and the first to third spectral data to the outside.

The data terminal may be a computer or a smartphone and may be configured to automatically perform control such that operations of the first and second spectrum collection units and the data analyzer can be collectively performed through operation-related firmware or individually performed through operation-related programs or to manually control the first and second spectrum collection units and the data analyzer through manipulation at the outside in a wired or wireless manner, to store the first to third spectral data and the spectral data in the data analyzer or to store the first to third spectral data and the spectral data in an Internet server over wireless Internet, to receive the first to third spectral data and the spectral data from the data analyzer or the Internet server and to internally analyze the first to third spectral data and the spectral data through an analysis-related program, when the operation-related firmware operation-related program is operated internally or when a menu on an analysis platform including software, an application program, a web page, or a website is clicked externally, to retrieve the first to third spectral data and the spectral data from the data analyzer or the Internet server and to display the first to third spectral data and the spectral data on a screen so as to be visible from the outside, and when the operation-related firmware or the operation-related program is operated internally or when the menu on the analysis platform including the software, the application program, the web page, or the website is clicked externally, to display material analysis results including the type and material concentration of the measurement target material obtained through the spectral data and materials detected as being abnormal on an analysis summary screen.

DETAILED DESCRIPTION OF THE PREFERRED EMBODIMENTS

Hereinafter, preferred embodiments of the present invention will be described in detail with reference to the accompanying drawings such that the present invention can be easily implemented by a person having ordinary skill in the art to which the present invention pertains.

Figure 1:
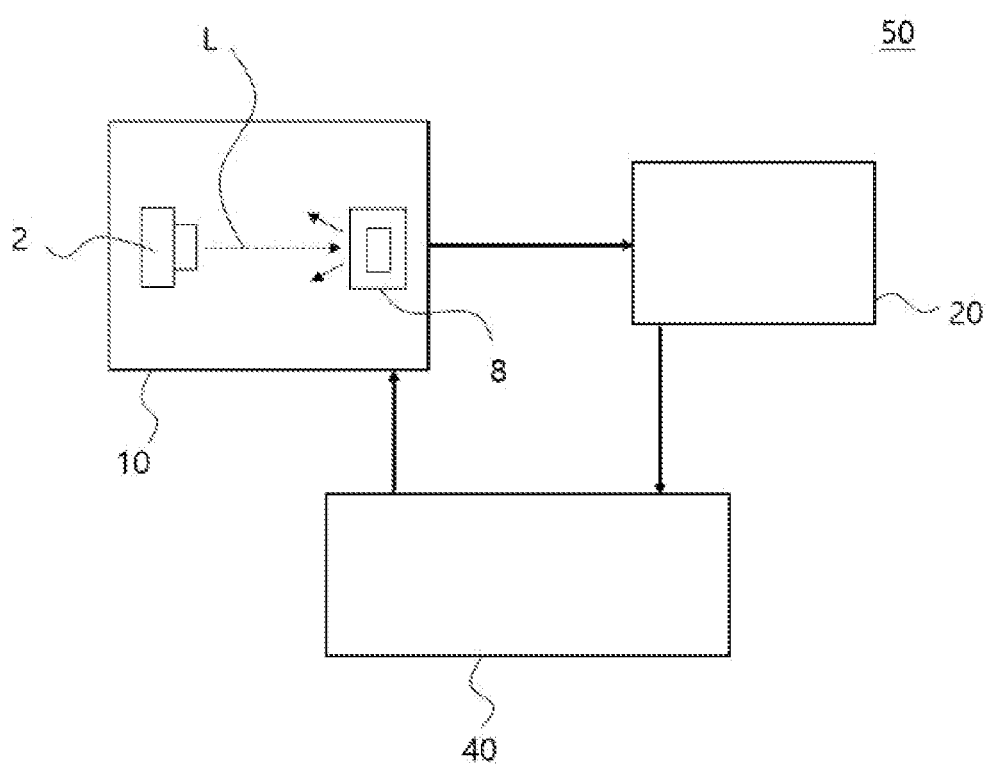
FIG. 1 is a schematic view showing a conventional Raman spectrometer.
Figure 2:
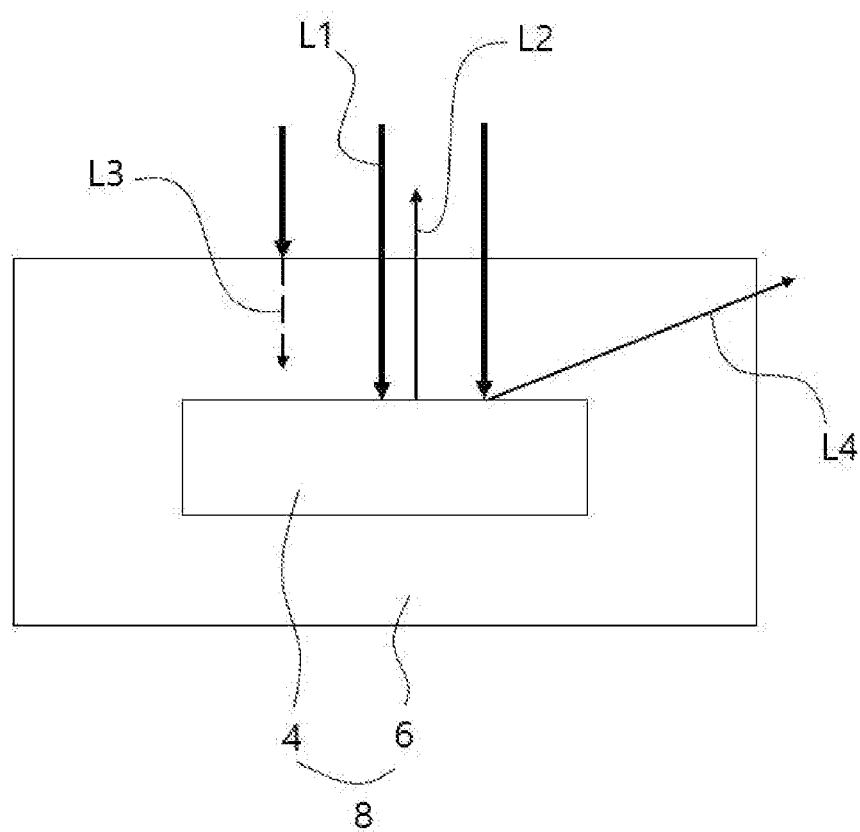
FIG. 2 is a schematic view showing light of a laser source radiated to a sample collected from outdoors in an optical detection unit of FIG. 1.
Figure 3:
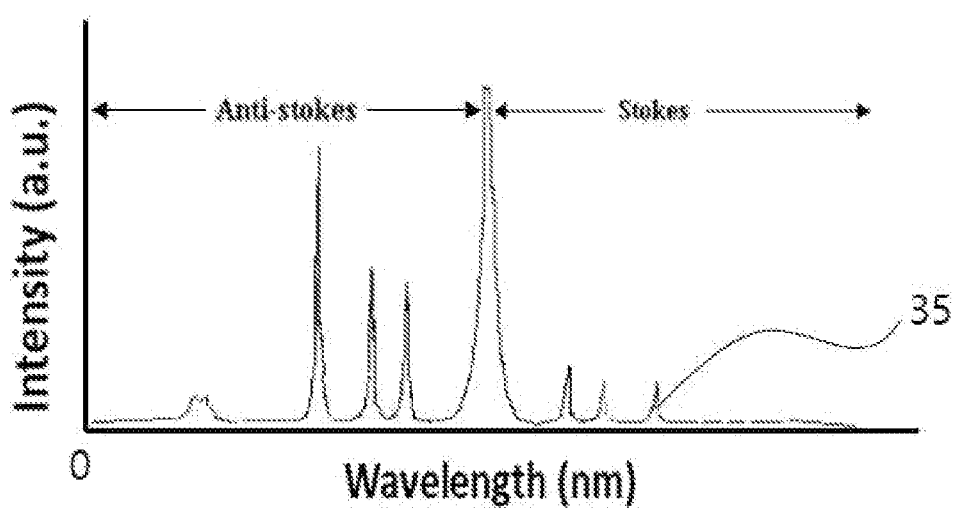
FIG. 3 is a graph showing that spectral data calculated by an optical operator of FIG. 1 is output to the outside by a controller.
Figure 4:
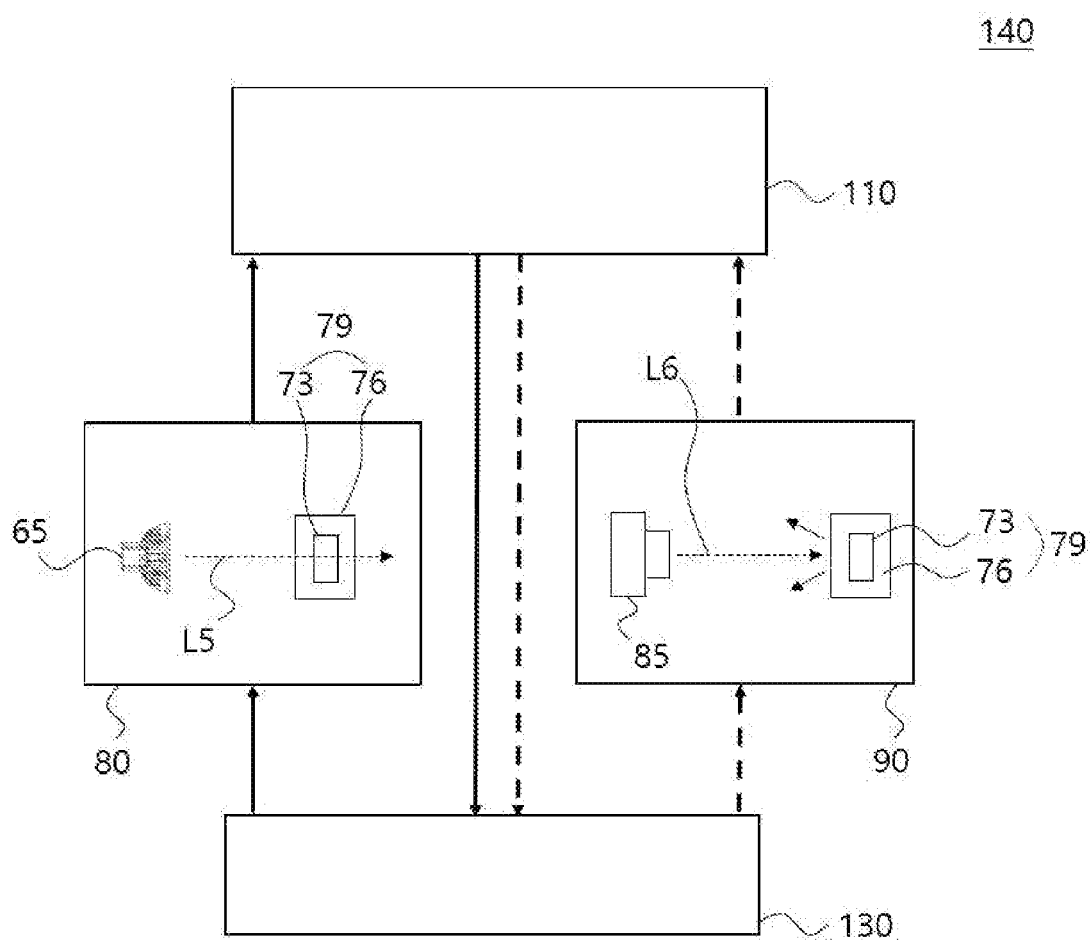
FIG. 4 is a schematic view showing a sample ingredient analysis apparatus according to the present invention.
Figure 5:
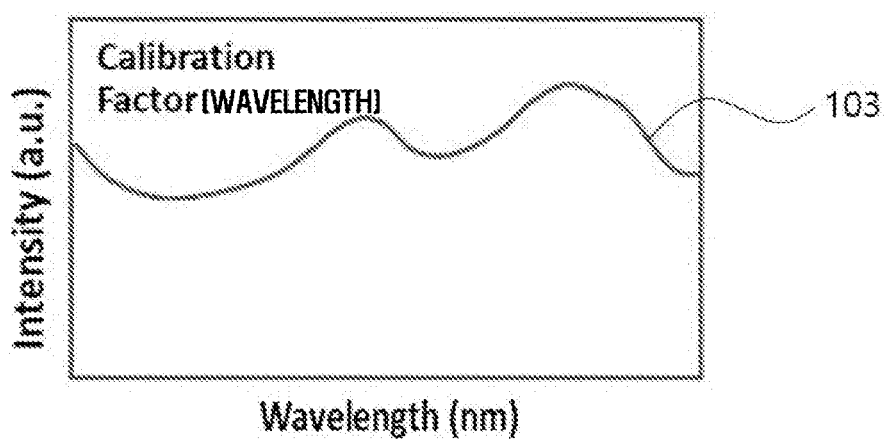
FIG. 5 is a graph showing that first spectral data is represented as light intensity of a wavelength function in a data analyzer of FIG. 4.

FIG. 4 is a schematic view showing a sample ingredient analysis apparatus according to the present invention, and FIG. 5 is a graph showing that first spectral data is represented as light intensity of a wavelength function in a data analyzer of FIG. 4.

Figure 6:
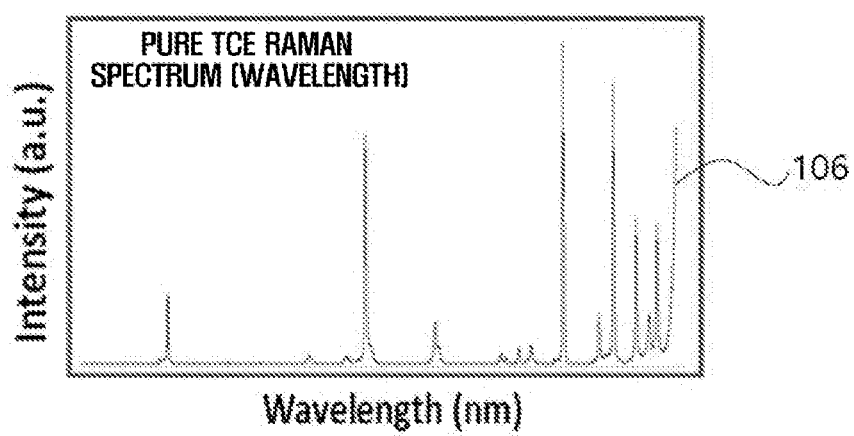
FIG. 6 is a graph showing that third spectral data associated with a measurement target material is represented as light intensity of a wavelength function without a medium in the data analyzer of FIG. 4.
Figure 7:
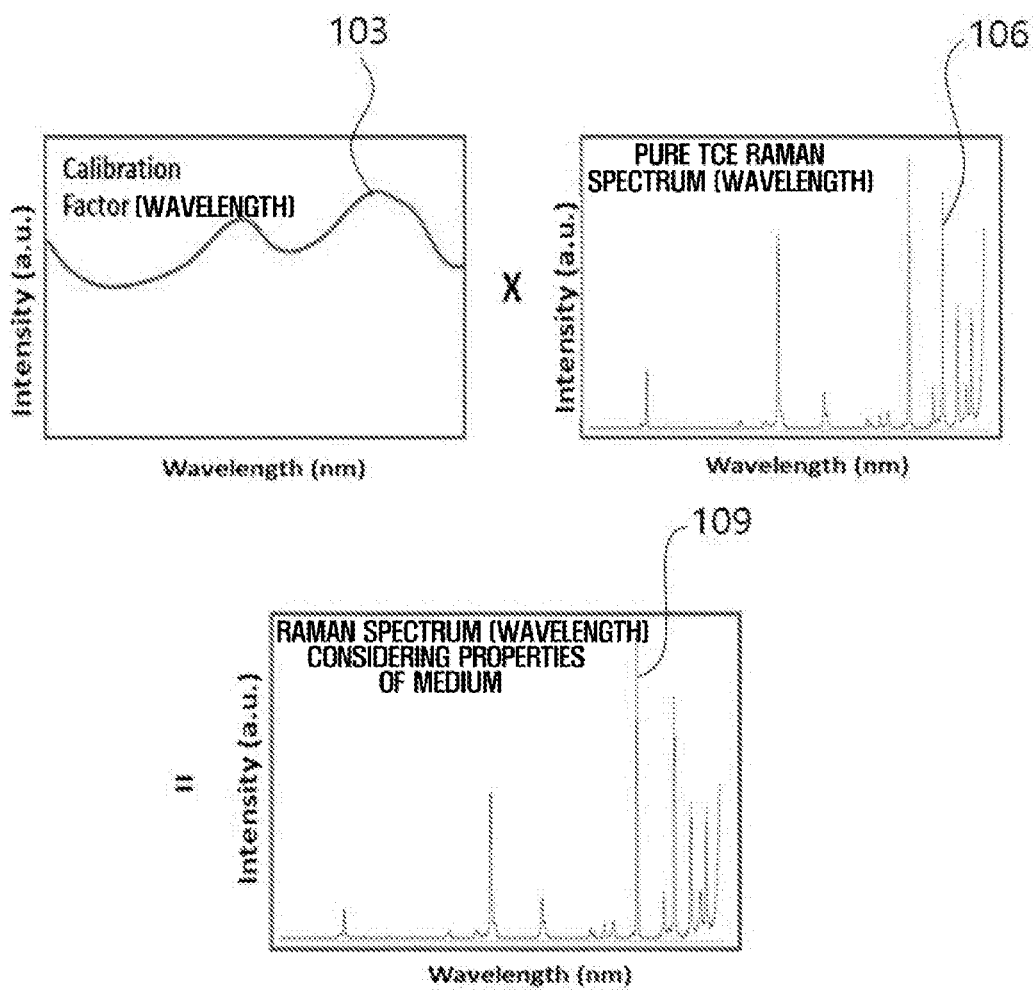
FIG. 7 is a graph showing a process of calculating spectral data based on the first and third spectral data in the data operator of FIG. 4.

FIG. 6 is a graph showing that third spectral data associated with a measurement target material is represented as light intensity of a wavelength function without a medium in the data analyzer of FIG. 4, and FIG. 7 is a graph showing a process of calculating spectral data based on the first and third spectral data in the data operator of FIG. 4.

Figure 8:
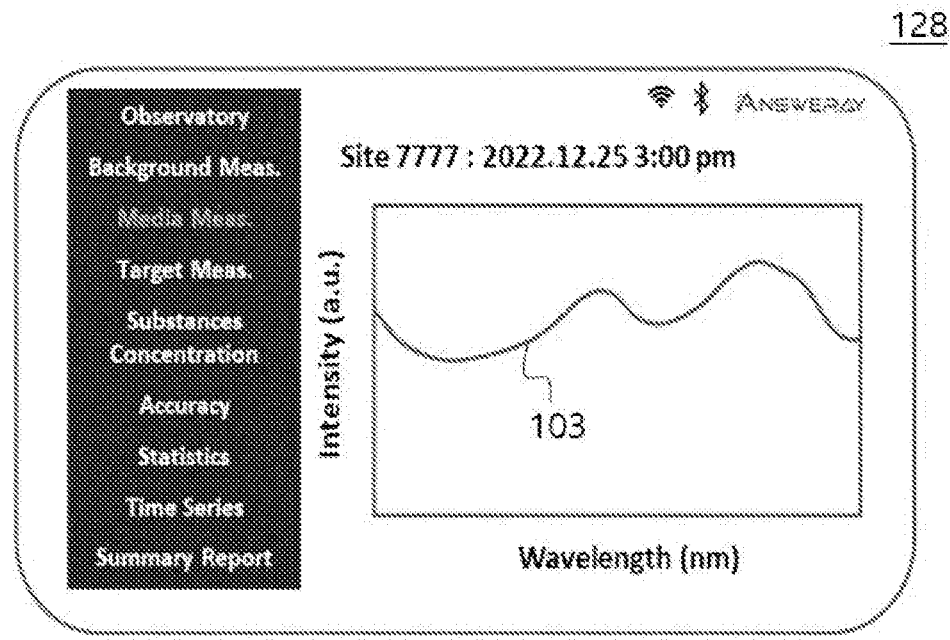
FIG. 8 is an image showing the first spectral data when operation-related firmware or an operation-related program is executed in a data terminal of FIG. 4 or when a menu on an analysis platform including software, an application program, a web page, or a website is clicked outside the data terminal.
Figure 9:
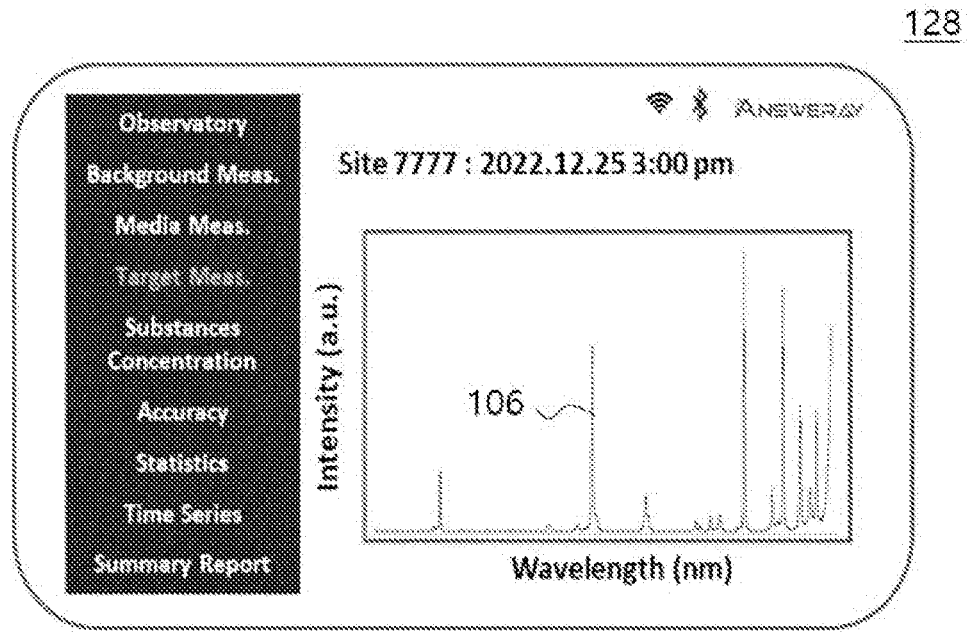
FIG. 9 is an image showing the third spectral data when the operation-related firmware or the operation-related program is executed in the data terminal of FIG. 4 or when the menu on the analysis platform including the software, the application program, the web page, or the website is clicked outside the data terminal.

FIG. 8 is an image showing the first spectral data when operation-related firmware or an operation-related program is executed in a data terminal of FIG. 4 or when a menu on an analysis platform including software, an application program, a web page, or a website is clicked outside the data terminal, and FIG. 9 is an image showing the third spectral data when the operation-related firmware or the operation-related program is executed in the data terminal of FIG. 4 or when the menu on the analysis platform including the software, the application program, the web page, or the website is clicked outside the data terminal.

Figure 10:
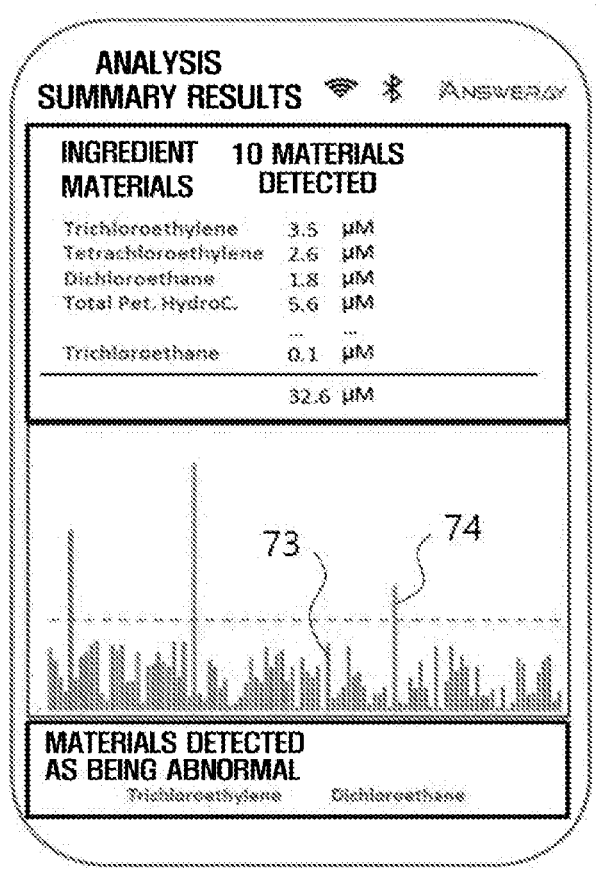
FIG. 10 is an image showing the spectral data when the operation-related firmware or the operation-related program is executed in the data terminal of FIG. 4 or when the menu on the analysis platform including the software, the application program, the web page, or the website is clicked outside the data terminal.

In addition, FIG. 10 is an image showing the spectral data when the operation-related firmware or the operation-related program is executed in the data terminal of FIG. 4 or when the menu on the analysis platform including the software, the application program, the web page, or the website is clicked outside the data terminal.

Referring to FIGS. 4 to 10, the sample ingredient analysis apparatus 140 according to the present invention includes a first spectrum collection unit 80, a second spectrum collection unit 90, a data analyzer 110, and a data terminal 130. The first spectrum collection unit 80 radiates first light L5 to a sample 79 to generate a first spectrum (not shown) and concentrates the first spectrum.

The second spectrum collection unit 90 radiates second light L6 to the sample 79 to generate a second spectrum (not shown) and concentrates the second spectrum. The data analyzer 110 receives the first and second spectra from the first and second spectrum collection units 80 and 90, generates first and second spectral data 103 (FIG. 5) and 106 (FIG. 6) based on the first and second spectra, and calculates the first and second spectral data 103 and 106 to obtain spectral data 107 (FIG. 7).

The data terminal 130 receives the first and second spectral data 103 and 106 and the spectral data 107 from the data analyzer 110, and displays the first and second spectral data 103 and 106 and the spectral data 107 to the outside. The sample 79 is collected outdoors or indoors, and includes at least one measurement target material 73 and a medium 76 that encloses the measurement target material 73.

The first spectrum is generated as the result of first light L5 of a broadband wavelength emitted from a lamp 65 being transmitted through or reflected from the sample 79 when the first light L5 is incident on the sample 79 in the first spectrum collection unit 80. The first spectrum has lower intensity than the first light L5. The first spectrum is related to an attenuation effect of the sample 79 through absorption, reflection, and scattering on the first light L5 while the first light L5 is radiated to the sample 79. Consequently, the first spectrum is related to elastic scattering properties of the sample.

The second spectrum is generated as the result of second light L6 of a narrowband wavelength emitted from a laser light source 85 being Raman scattered from the sample 79 when the second light L6 is incident on the sample 79 in the second spectrum collection unit 90, and has a longer wavelength than the second light L6. The second spectrum is related to a Raman effect of the sample 79 on the second light L6 while the second light L6 is radiated to the sample 79. Consequently, the second spectrum is related to inelastic scattering properties of the sample 79.

The first spectral data 103 is represented as $I_{out}(\lambda)/I_{in}(\lambda)=F(\lambda)$ when the first light L5 is represented as incident light intensity $I_{in}(\lambda)$ of a wavelength function and the first spectrum is represented as transmitted light intensity $I_{out}(\lambda)$ of the wavelength function. When the measurement target material 73 generates the second spectrum through Raman scattering after contact between the second light L6 and the sample 79, the second spectral data (not shown) represents the second spectrum as light intensity $S(\lambda)$ of the wavelength function.

When the first spectral data 103 ($F(\lambda)$) is represented as $I_{out}(\lambda)/I_{in}(\lambda)$, second is the spectral data $S(\lambda)$ represented as light intensity of the wavelength function, and the data analyzer 110 has in advance third spectral data 106 ($K(\lambda)$) corresponding to the measurement target material 73 without a medium as light intensity of the wavelength function, the spectral data 109 is obtained from S=F*K*C+R (where S is an n*1-dimensional matrix associated with $S(\lambda)$, F is an n*n-dimensional matrix associated with $F(\lambda)$ as a calibration K factor, is an n*m-dimensional matrix associated with $K(\lambda)$, C is an m*1-dimensional matrix, and R is an n*1-dimensional matrix), which is a matrix equation, in the data analyzer 110, and is realized as a value that has the same dimension as the matrix S and is close to the matrix S through the matrix F*K*C.

Here, the matrix R is the difference between the matrix S and the matrix F*K*C. The matrix C is concentration data of the measurement target material 73, and is represented as a matrix $((F*K)^T*(F*K))^{-1}*(F*K)^T*S$ as the result of the matrix R being minimized to a zero matrix through the calculation of the matrix equation.

When the data terminal 130 shares the third spectral data 106 of the data analyzer 110, the data terminal 130, which is a computer or a smartphone, automatically performs control such that the operations of the first and second spectrum collection units 80 and 90 and the data analyzer 110 can be collectively performed through operation-related firmware or individually performed through operation-related programs, or manually controls the first and second spectrum collection units 80 and 90 and the data analyzer 110 through manipulation at the outside in a wired or wireless manner.

In addition, the data terminal 130 stores the first spectral data 103, the second spectral data, and third spectral data 106, and the spectral data 109 in the data analyzer 110, or stores the first spectral data 103, the second spectral data, the third spectral data 106, and the spectral data 109 in a server on the Internet (not shown; hereinafter referred to as an "Internet server") over wired or wireless Internet, and when the operation-related firmware or the operation-related program is operated internally or when a menu on an analysis platform including software, an application program, a web page, or a website is clicked externally, the data terminal 130 retrieves the first spectral data 103, the second spectral data, the third spectral data 106, and the spectral data 109 from the data analyzer 110 or the Internet server and displays the first spectral data 103, the second spectral data, the third spectral data 106, and the spectral data 109 on a screen so as to be visible from the outside.

In addition, when the operation-related firmware or the operation-related program is operated internally or when the menu on the analysis platform including the software, the application program, the web page, or the website is clicked externally, the data terminal 130 displays the material analysis results including the type and material concentration of the measurement target material 73 obtained through the spectral data 109 and materials 74 detected as being abnormal on an analysis summary screen.

Figure 11:
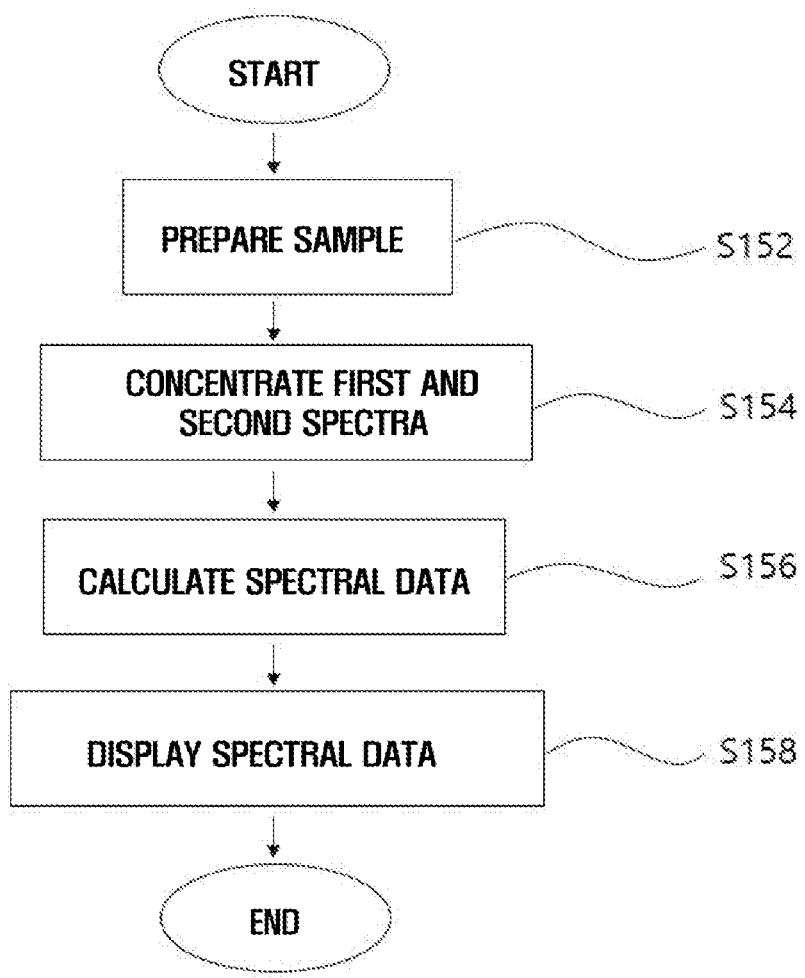
FIG. 11 is a flowchart illustrating a sample ingredient analysis method using the sample ingredient analysis apparatus according to the present invention.

FIG. 11 is a flowchart illustrating a sample ingredient analysis method using the sample ingredient analysis apparatus according to the present invention. The following description will be given with reference to FIGS. 4 to 10 as well as FIG. 11.

Referring to FIG. 11, the sample ingredient analysis method using the sample ingredient analysis apparatus includes separately preparing a sample in first and second spectrum collection units (S152), concentrating, by the first and second spectrum collection units 80 and 90 (FIG. 4), first and second spectra from the sample 79 (S154), calculating, by a data analyzer 110 (FIG. 4), spectral data 109 (FIG. 7) based on the first and second spectra (S156), and displaying, by a data terminal 130 (FIG. 4), the spectral data to the outside (S158).

Here, the sample is collected outdoors or indoors, and includes at least one measurement target material 73 and a medium 76 that encloses the measurement target material 73. The preparing a sample 79 (S152) includes locating the sample 79 in the first and second spectrum collection units 80 and 90 by moving the sample 79 or dividing the sample 79 and simultaneously locating the divided samples in the first and second spectrum collection units 80 and 90.

The concentrating first and second spectra (S154) includes radiating, by a first optical instrument (not shown) of the first spectrum collection unit 80, first light L5 to the sample 79 to collect a first spectrum (not shown) while generating the first spectrum from the sample 79 and radiating, by a second optical instrument (not shown) of the second spectrum collection unit 90, second light L6 to the sample 79 to collect a second spectrum (not shown) while generating the second spectrum from the sample 79.

Here, the first or second optical instrument includes at least one of a lamp 65, a laser light source 85, a lens, a mirror, an optical fiber, a dichroic mirror, a band pass filter, a long pass filter, a diffraction grating, and a prism. The first spectrum is generated as the result of first light L5 of a broadband wavelength emitted from the lamp 65 being transmitted through or reflected from the sample 79 when the first light L5 is incident on the sample 79 in the first spectrum collection unit 80, and has lower intensity than the first light L5.

The second spectrum is generated as the result of second light L6 of a narrowband wavelength emitted from the laser light source 85 being Raman scattered from the sample 79 when the second light L6 is incident on the sample 79 in the second spectrum collection unit 90, and has a longer wavelength than the second light L6.

The calculating spectral data 109 (S156) includes generating, by an optical detection unit (not shown) of the data analyzer 110, first spectral data 103 and second spectral data (not shown) based on the first and second spectra received from the first and second spectrum collection units 80 and 90 and calculating, by a calculation unit (not shown) of the data analyzer 110, the first spectral data 103 and the second spectral data to obtain spectral data 109.

When the first spectrum collection unit 80 collects the first spectrum from the sample 79 as the result of the first light L5 of the broadband wavelength from the lamp 65 being incident on the sample 79 and the data analyzer 110 represents the first light L5 as incident light intensity $I_{in}(\lambda)$ of a wavelength function and the first spectrum as transmitted light intensity $I_{out}(\lambda)$ of the wavelength function, the first spectral data 103 is represented as $I_{out}(\lambda)/I_{in}(\lambda)=F(\lambda)$ in the detection unit of the data analyzer 110.

When the second spectrum collection unit 90 collects the second spectrum from the sample 79 as the result of the second light L6 of the narrowband wavelength from the laser light source 85 being incident on the sample 79, the second spectral data represents the second spectrum as light intensity $S(\lambda)$ of the wavelength function in the detection unit of the data analyzer 110.

When the first spectral data 103 ($F(\lambda)$) is represented as $I_{out}(\lambda)/I_{in}(\lambda)$, the second spectral data $S(\lambda)$ is represented as light intensity of the wavelength function, and the data analyzer 110 has in advance third spectral data $K(\lambda)$ corresponding to the measurement target material 73 without a medium as light intensity of the wavelength function, the spectral data 109 is obtained from S=F*K*C+R (where S is an n*1-dimensional matrix associated with $S(\lambda)$, F is an n*n-dimensional matrix associated with $F(\lambda)$ as a calibration factor, K an is n*m-dimensional matrix associated with $K(\lambda)$, C is an m*1-dimensional matrix, and R is an n*1-dimensional matrix), which is a matrix equation, in the calculator of the data analyzer 110, and is realized as a value that has the same dimension as the matrix S and is close to the matrix S through the matrix F*K*C.

The matrix R is the difference between the matrix S and the matrix F*K*C. The matrix C is concentration data of the measurement target material 73, and is represented as a matrix $((F*K)^T*(F*K))^{-1}*(F*K)^T*S$ as the result of the matrix R being minimized to a zero matrix through the calculation of the matrix equation.

When the data analyzer 110 has the first spectral data 103, the second spectral data, and the spectral data 109 and the data terminal 130 shares the third spectral data 106 of the data analyzer 110, the displaying the spectral data to the outside (S158) includes receiving, by the data terminal 130, the first spectral data 103, the second spectral data, the third spectral data 106, and the spectral data 109 from the data analyzer 110 and displaying, by the data terminal 130, the first spectral data 103, the second spectral data, the third spectral data 106, and the spectral data 109 to the outside.

The data terminal 130, which is a computer or a smartphone, automatically performs control such that the operations of the first and second spectrum collection units 80 and 90 and the data analyzer 110 can be collectively performed through operation-related firmware or individually performed through operation-related programs, or manually controls the first and second spectrum collection units 80 and 90 and the data analyzer 110 through manipulation at the outside in a wired or wireless manner. In addition, the data terminal 130 stores the first to third spectral data and the spectral data in the data analyzer 110, or stores the first spectral data 103, the second spectral data, the third spectral data 106, and the spectral data 109 in an Internet server over wired or wireless Internet, internally analyzes the first to third spectral data and the spectral data 109 received from the data analyzer 110 or the Internet server through an analysis-related program, and when the operation-related firmware or the operation-related program is operated internally or when a menu on an analysis platform including software, an application program, a web page, or a website is clicked externally, retrieves the first spectral data 103, the second spectral data, the third spectral data 106, and the spectral data 109 from the data analyzer 110 or the Internet server and displays the first spectral data 103, the second spectral data, the third spectral data 106, and the spectral data 109 on a screen so as to be visible from the outside. In addition, when the operation-related firmware or the operation-related program is operated internally or when the menu on the analysis platform including the software, the application program, the web page, or the website is clicked externally, the data terminal 130 displays the material analysis results including the type and material concentration of the measurement target material 73 obtained through the spectral data 109 and materials 74 detected as being abnormal on an analysis summary screen.

A sample ingredient analysis apparatus according to the present invention and a sample ingredient analysis method using the same are configured as follows.

The sample ingredient analysis apparatus includes a first spectrum collection unit, a second spectrum collection unit, and a data analyzer configured to be controlled through a data terminal.

In the sample ingredient analysis method, a sample collected outdoors or indoors is placed in the first spectrum collection unit and the second spectrum collection unit, and at the time of sample analysis, the data analyzer calculates spectral data in consideration of elastic scattering properties of the sample in the first spectrum collection unit and inelastic scattering properties of the sample in the second spectrum collection unit.

When a sample collected outdoors or indoors and medium that encloses at least one target including a placed in the sample ingredient analysis material is apparatus, therefore, the data analyzer calculates spectral data of the sample in consideration of the properties of the medium and the properties of the target material, and the data terminal receives the spectral data from the data analyzer or an Internet server, whereby it is possible to rapidly and accurately analyze the sample based on the spectral data.

What is claimed is:

1. A sample ingredient analysis apparatus comprising:
a first spectrum collection container and a second spectrum collection container configured to store a sample;
a lamp configured to radiate first light of a first wavelength to the sample in order to generate a first spectrum and to concentrate the first spectrum;
a laser light source configured to radiate second light of a second wavelength to the sample in order to generate a second spectrum and to concentrate the second spectrum, the second wavelength being narrower than the first wavelength;
a data analyzer configured to receive the first and second spectra to generate first and second spectral data based on the first and second spectra, and to calculate the first and second spectral data in order to obtain spectral data; and
a data terminal configured to receive the first and second spectra data and the spectral data from the data analyzer and to display the first and second spectra and the spectral data to an outside, wherein
the sample is collected outdoors or indoors and comprises at least one measurement target material and a medium configured to enclose the measurement target material, and
when the first light is represented as incident light intensity ($I_{in}(\lambda)$) of a wavelength function and the first spectrum is represented as transmitted light intensity ($I_{out}(\lambda)$) of the wavelength function, the first spectral data is represented as $I_{out}(\lambda)/I_{in}(\lambda)=F(\lambda)$.

2. The sample ingredient analysis apparatus according to claim 1, wherein the first spectrum is generated as a result of the first light of the first wavelength emitted from the lamp being transmitted through or reflected from the sample when the first light is incident on the sample, and has lower intensity than the first light.

3. The sample ingredient analysis apparatus according to claim 1, wherein the second spectrum is generated as a result of the second light of the second wavelength emitted from the laser light source being Raman scattered from the sample when the second light is incident on the sample, and has a longer wavelength than the second light.

4. The sample ingredient analysis apparatus according to claim 1, wherein
when the measurement target material generates the second spectrum through Raman scattering after contact between the second light and the sample,
the second spectral data represents the second spectrum as light intensity ($S(\lambda)$) of a wavelength function.

5. The sample ingredient analysis apparatus according to claim 1, wherein
when the first spectral data ($F(\lambda)$) is represented as $I_{out}(\lambda)/I_{in}(\lambda)$, the second spectral data ($S(\lambda)$) is represented as light intensity of a wavelength function, and the data analyzer has in advance third spectral data ($K(\lambda)$) corresponding to the measurement target material without a medium as light intensity of the wavelength function,
the spectral data is obtained from $S=F*K*C+R$ (where S is an $n*1$-dimensional matrix associated with $S(\lambda)$, F is an $n*n$-dimensional matrix associated with $F(\lambda)$ as a calibration factor, K is an $n*m$-dimensional matrix associated with $K(\lambda)$, C is an $m*1$-dimensional matrix, and R is an $n*1$-dimensional matrix), which is a matrix equation, in the data analyzer, and is realized as a value that has a same dimension as the matrix S and is close to the matrix S through the matrix $F*K*C$.

6. The sample ingredient analysis apparatus according to claim 1, wherein
when the data analyzer shares third spectral data of the data terminal,
the data terminal is a computer or a smartphone and is configured:
to automatically perform control such that operations of the lamp, the laser light source, and the data analyzer can be collectively performed through operation-related firmware or individually performed through operation-related programs or to manually control the lamp, the laser light source, and the data analyzer through manipulation at an outside in a wired or wireless manner;
to store the first to third spectral data and the spectral data in the data analyzer or to store the first to third spectral data and the spectral data in an Internet server over wired or wireless Internet;
to receive the first to third spectral data and the spectral data from the data analyzer or the Internet server and to internally analyze the first to third spectral data and the spectral data through an analysis-related program;
when the operation-related firmware or the operation-related program is operated internally or when a menu on an analysis platform comprising software, an application program, a web page, or a website is clicked externally, to retrieve the first to third spectral data and the spectral data from the data analyzer or the Internet server and to display the first to third spectral data and the spectral data on a screen so as to be visible from the outside; and
when the operation-related firmware or the operation-related program is operated internally or when the menu on the analysis platform comprising the software, the application program, the web page, or the website is clicked externally, to display material analysis results comprising a type and material concentration of the measurement target material obtained through the spectral data and materials detected as being abnormal on an analysis summary screen.

7. The sample ingredient analysis apparatus according to claim 1, wherein the data analyzer is further configured to provide a component of the measurement target material by using the spectral data.

8. The sample ingredient analysis apparatus according to claim 5, wherein
the matrix R is a difference between the matrix S and the matrix F*K*C, and
the matrix C is concentration data of the measurement target material and is represented as a matrix $((F*K)^T*(F*K))^{-1}*(F*K)^T*S$ as a result of the matrix R being minimized to a zero matrix through calculation of the matrix equation.

9. A sample ingredient analysis method using a sample ingredient analysis apparatus, the sample ingredient analysis method comprising:
preparing a sample in first and second spectrum collection containers;
radiating, by a lamp, first light of a first wavelength to a sample to generate a first spectrum;
radiating, by a laser light source, second light of a second wavelength to the sample to generate a second spectrum, the second wavelength being narrower than the first wavelength;
concentrating the first spectrum and the second spectrum;
calculating, by a data analyzer, spectral data based on the first and second spectra; and
displaying, by a data terminal, the spectral data to an outside, wherein
the sample is collected outdoors or indoors and comprises at least one measurement target material and a medium configured to enclose the measurement target material,
the calculating spectral data comprises generating, by the data analyzer, first and second spectral data based on the first and second spectra and calculating the first and second spectral data to obtain the spectral data, and
when the first spectral data ($F(\lambda)$ is represented as $I_{out}(\lambda)/I_{in}(\lambda)$), the second spectral data ($S(\lambda)$) is represented as light intensity of a wavelength function, and the data analyzer has in advance third spectral data ($K(\lambda)$) corresponding to the measurement target material without a medium as light intensity of the wavelength function,
the spectral data is obtained from S=F*K*C+R (where S is an n*1-dimensional matrix associated with $S(\lambda)$, F is an n*n-dimensional matrix associated with $F(\lambda)$ as a calibration factor, K is an n*m-dimensional matrix associated with $K(\lambda)$, C is an m*1-dimensional matrix, and R is an n*1-dimensional matrix), which is a matrix equation, in a calculator of the data analyzer, and is realized as a value that has a same dimension as the matrix S and is close to the matrix S through the matrix F*K*C.

10. The sample ingredient analysis method according to claim 9, wherein the preparing the sample comprises locating the sample in the first and second spectrum collection containers by moving the sample or dividing the sample and simultaneously locating the divided samples in the first and second spectrum collection containers.

11. The sample ingredient analysis method according to claim 9, wherein the first spectrum is generated as a result of the first light of the first wavelength emitted from the lamp being transmitted through or reflected from the sample when the first light is incident on the sample in the first spectrum collection container, and has lower intensity than the first light.

12. The sample ingredient analysis method according to claim 8, wherein the second spectrum is generated as a result of the second light of the narrowband second wavelength emitted from the laser light source being Raman scattered from the sample when the second light is incident on the sample in the second spectrum collection container, and has a longer wavelength than the second light.

13. The sample ingredient analysis method according to claim 9, wherein
when the first spectrum is collected from the sample as a result of the first light of the first wavelength from the lamp being incident on the sample and the data analyzer represents the first light as incident light intensity ($I_{in}(\lambda)$) of a wavelength function and the first spectrum as transmitted light intensity ($I_{out}(\lambda)$) of the wavelength function,
the first spectral data is represented as $I_{out}(\lambda)/I_{in}(\lambda)=F(\lambda)$.

14. The sample ingredient analysis method according to claim 9, wherein
when the second spectrum is collected from the sample as a result of the second light of the second wavelength from the laser light source being incident on the sample,
the second spectral data represents the second spectrum as light intensity ($S(\lambda)$) of a wavelength function.

15. The sample ingredient analysis method according to claim 9, wherein
the matrix R is a difference between the matrix S and the matrix F*K*C, and
the matrix C is concentration data of the measurement target material and is represented as a matrix $((F*K)^T*(F*K))^{-1}*(F*K)^T*S$ as a result of the matrix R being minimized to a zero matrix through calculation of the matrix equation.

16. The sample ingredient analysis method according to claim 9, wherein
when the data analyzer has the spectral data and first and second spectral data and the data terminal shares third spectral data of the data analyzer,
the displaying the spectral data to an outside comprises:
receiving, by the data terminal, the spectral data and the first to third spectral data from the data analyzer; and
displaying, by the data terminal, the spectral data and the first to third spectral data to the outside.

17. The sample ingredient analysis method according to claim 16, wherein the data terminal is a computer or a smartphone and is configured:
to automatically perform control such that operations of the lamp, the laser light source, and the data analyzer can be collectively performed through operation-related firmware or individually performed through operation-related programs or to manually control the lamp, the laser light source, and the data analyzer through manipulation at an outside in a wired or wireless manner;
to store the first to third spectral data and the spectral data in the data analyzer or to store the first to third spectral data and the spectral data in an Internet server over wireless Internet;
to receive the first to third spectral data and the spectral data from the data analyzer or the Internet server and to internally analyze the first to third spectral data and the spectral data through an analysis-related program;
when the operation-related firmware or the operation-related program is operated internally or when a menu on an analysis platform comprising software, an application program, a web page, or a website is clicked externally, to retrieve the first to third spectral data and the spectral data from the data analyzer or the Internet server and to display the first to third spectral data and the spectral data on a screen so as to be visible from the outside; and when the operation-related firmware or the operation-related program is operated internally or when the menu on the analysis platform comprising the software, the application program, the web page, or the website is clicked externally, to display material analysis results comprising a type and material concentration of the measurement target material obtained through the spectral data and materials detected as being abnormal on an analysis summary screen.

\* \* \* \* \*